Nov. 12, 1957  J. A. MORRIS  2,812,995
DIRECT DEPTH RECORDER
Filed March 17, 1954
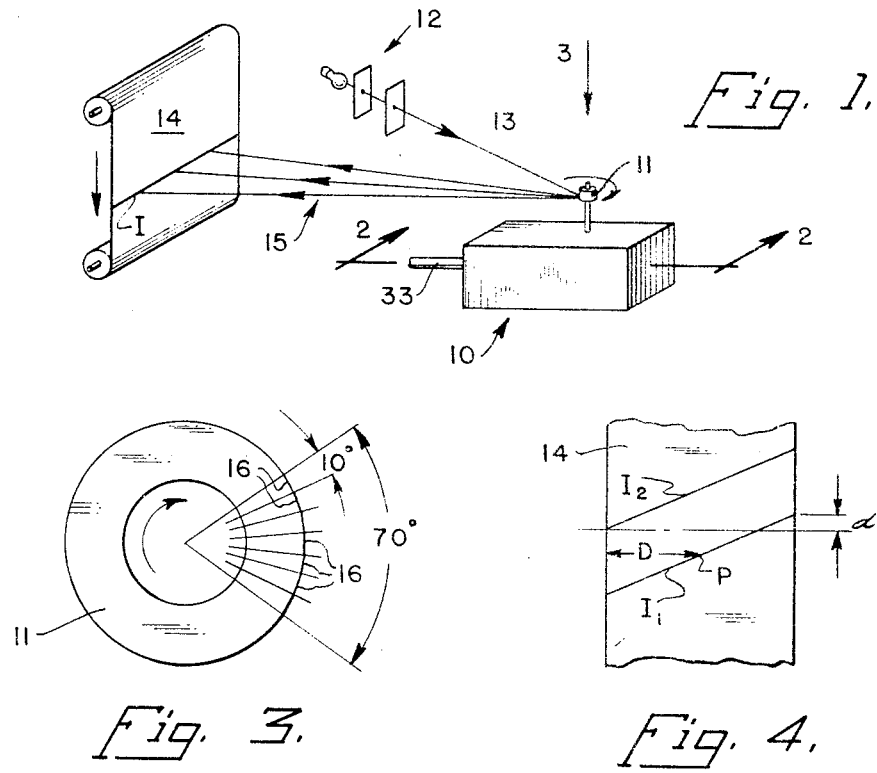
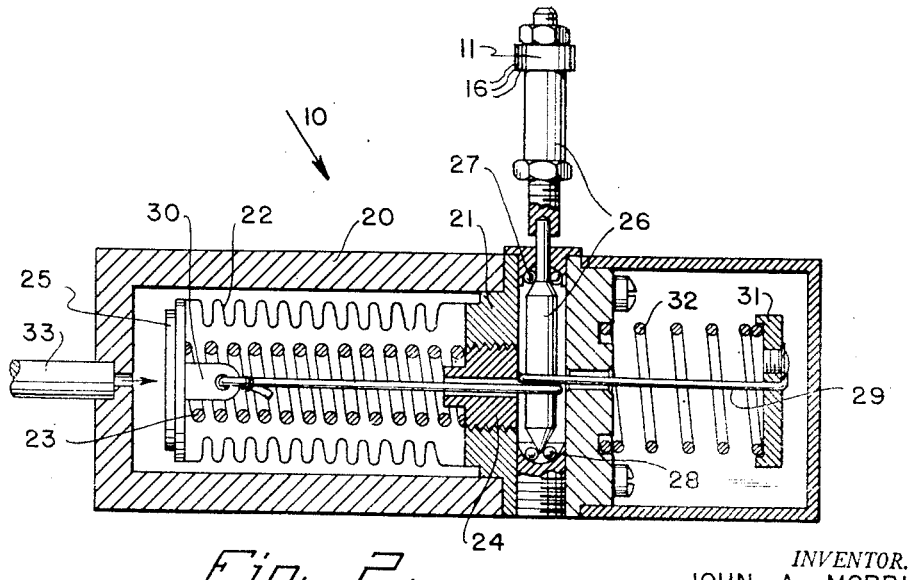
INVENTOR.
JOHN A. MORRIS
BY
ATTORNEYS

2,812,995
DIRECT DEPTH RECORDER

John A. Morris, Farrell, Pa., assignor, by mesne assignments, to the United States of America as represented by the Secretary of the Navy Application March 17, 1954, Serial No. 416,972

2 Claims. (Cl. 346—108)

This invention relates to pressure recording apparatus, and more particularly to improvements in depth recording apparatus for use in torpedoes.

In testing the runs of present torpedoes, various performance data must be recorded at various depths of submergence, the common practice of determining the depth being by measuring the hydrostatic ambient water pressure. Since water pressure may vary between 0 and 500 p. s. i., or more, it will be apparent that such wide range of pressures has rendered difficult the construction of compact pressure sensing apparatus of sufficient sensitivity to provide data of desired accuracy. Various devices employing spring loaded pistons, rigid linkage, etc. have been employed for this purpose but have not been entirely satisfactory due to sticking and binding of parts, and other malfunctions.

One of the objects of the present invention is to provide pressure recording apparatus which is highly sensitive to pressure changes throughout a large range of pressures.

Another object is to provide apparatus of the foregoing type which may be readily altered to provide greater resolution over a smaller range of pressures.

Another object is to provide apparatus which provides relatively large optical resolution of pressure data on photographic film of relatively narrow width.

Still further objects, advantages and salient features will become more apparent from the description to follow, the appended claims, and the accompanying drawing, in which:

Fig. 1 is a diagrammatic illustration of the invention;
Fig. 2 is an enlarged section taken on line 2—2, Fig. 1;
Fig. 3 is a greatly enlarged plan of a mirror employed in Figs. 1 and 2, and
Fig. 4 is an exemplary illustration of pressure data recorded on a photographic film.

Referring in detail to the drawing, the subject of the invention comprises, in general, a pressure responsive device 10, a mirror 11 which is rotated by the pressure responsive device, a point source of light 12 adapted to beam a ray of light 13 onto the mirror, and a moving photographic film 14 upon which an incident ray of light 15 from the mirror is directed.

Referring to Fig. 3, the mirror is formed as a hollow cylinder, ground to provide seven flat facets 16 on its periphery, each facet having an angular extent of 10°, the facets being front silvered.

In the operation of the device, the mirror is rotated by pressure responsive device 10 as the pressure of the ambient water changes, which effects movement of the incident beam across photographic film 14, as best shown in Fig. 1, producing a latent image I on the film. Fig. 4 illustrates the developed film and images produced by two adjacent facets. It will be observed that one of the facets produces an image $I_1$ extending across the film from left to right and as the ray of light is no longer directed onto the film the adjacent succeeding facet produces image $I_2$. There is some overlap so that the ray from a succeeding facet is directed onto the film before the preceding ray from the preceding facet moves off the film, as indicated by distance $d$. The lateral distance D of any point P from a reference line, such as the left edge of the film (Fig. 4) is a measure of the pressure. Thus, each facet produces an image for a range of pressures. As an example, if the device is constructed to measure pressures between 0 and 700 p. s. i., each facet will produce an image through a range of the total difference in pressure divided by the number of facets, which, with seven facets would be 100 p. s. i. Assuming that image $I_1$ is formed by the first of the facets, this image represents pressures between 0 and 100 p. s. i. The second facet would then produce image $I_2$, this representing pressures between 100 p. s. i. and 200 p. s. i. In the foregoing example the overlap $d$, when two images are being formed by adjacent facets, has been neglected, thus the range of each facet would be somewhat in excess of 100 p. s. i. Since the film moves at constant speed, the longitudinal distance along the film from a zero starting point to a point P determines the time at which a particular pressure at point P occurred, thus the depth of submergence of the torpedo at any particular time may be readily determined. The images $I_1$, $I_2$ are illustrated as straight lines which indicates that the torpedo has descended in the water at a constant rate. It will be apparent, however, that if the torpedo changes depth of submergence at other than a constant rate the lines will take the form of curves.

Assuming that seven facets are employed on the mirror and the film is of a predetermined width, say three inches, it will be apparent that it would require a film of twenty-one inch width to obtain the same resolution if only a single facet were employed.

Referring to Fig. 2, which illustrates a preferred embodiment of a pressure responsive device for rotating the mirror, such device comprises a casing 20 closed at one end by a closure 21, the latter having one end of a compressible bellows 22 secured thereto. A suitable compression main spring 23 is disposed within the bellows, one end abutting and adjustable abutment 24 threadedly engaging the plug and the other end abutting a closure 25, secured to the other end of the bellows. A spindle 26, is rotatably carried by closure 21, supported by ball bearings 27, 28. A nylon cord 29 is wrapped around the spindle, one end of the cord being secured to a lug 30 on closure 25, and the other end being secured to a washer 31 against which a take up spring 32 abuts.

In the operation of the device, sea pressure is changed to oil pressure in any manner well known in the art, the oil communicating with the closed space between the bellows and casing by a conduit 33. As sea pressure and corresponding oil pressure increase the bellows is contracted against the urge of main spring 23, which permits take up spring 32 to extend, thus rotating spindle 26 and mirror 11 in one direction by cord 29. As will be apparent, a decrease in pressure effects rotation of the mirror in the opposite direction. The main spring may be chosen to provide a desired pressure range and may be omitted when the pressure range is relatively small, since the bellows has a spring constant, also. In one embodiment of the invention the bellows was constructed for a range of pressures from 0 to about 100 p. s. i. and when the main spring was employed, in addition, the pressure range was extended to about 500 p. s. i.

Obviously many modifications and variations of the present invention are possible in the light of the above teachings. It is therefore to be understood that within the scope of the appended claims the invention may be practiced otherwise than as specifically described.

What is claimed is:

1. Pressure recording apparatus comprising a photographic film adapted to move rectilinearly at constant velocity, a point source of light, a rotatable member, and a pressure responsive device for rotating said member, said member having a plurality of light reflecting facets, each facet having a pair of spaced edges disposed parallel to the axis of rotation of the member, one edge of one facet being an edge of an adjacent facet, the edges being disposed equi-angularly about said axis of rotation, the construction and arrangement being such that as said member rotates, the facets may successively reflect light from the source onto the film and form traces across the latter, said pressure responsive device comprising a casing adapted to receive the pressure, a bellows within the casing adapted to contract in response to increase in pressure, a spring adapted to expand when the pressure increases, a rotatable spindle to which the rotatable member is affixed, and a flexible cord-like member connected at opposite ends to the bellows and spring, an intermediate portion of the flexible member being wrapped around the spindle for rotating the latter.

2. Apparatus in accordance with claim 1 including a second spring disposed within the bellows adapted to contract when the pressure increases and acting to oppose contraction of the bellows.

References Cited in the file of this patent

UNITED STATES PATENTS

| | | |
|---|---|---|
| 737,298 | Tuch | Aug. 25, 1903 |
| 1,426,735 | Hendry | Aug. 22, 1922 |
| 1,490,223 | Midgley | Apr. 15, 1924 |
| 2,258,700 | Doll | Oct. 14, 1941 |
| 2,377,182 | Raspet | May 29, 1945 |
| 2,469,115 | Jagersberger | May 3, 1949 |
| 2,618,195 | Herman | Nov. 18, 1952 |

FOREIGN PATENTS

| | | |
|---|---|---|
| 614,746 | Great Britain | Dec. 22, 1948 |